United States Patent [19]

Kahrs

[11] Patent Number: 4,550,372

[45] Date of Patent: Oct. 29, 1985

[54] CONTROL SYSTEM FOR A VEHICULAR BRAKING SYSTEM INCORPORATING A HYDRODYNAMIC BRAKE AND A FRICTION BRAKE

[75] Inventor: Manfred Kahrs, Wiesbaden, Fed. Rep. of Germany

[73] Assignee: ITT Industries, Inc., New York, N.Y.

[21] Appl. No.: 529,315

[22] Filed: Sep. 6, 1983

Related U.S. Application Data

[63] Continuation-in-part of Ser. No. 273,832, Jun. 15, 1981, abandoned.

[30] Foreign Application Priority Data

Jul. 22, 1980 [DE] Fed. Rep. of Germany ....... 3027747

[51] Int. Cl.⁴ ..................... B60T 8/04; B60T 13/66; F16D 65/36
[52] U.S. Cl. ........................ 364/426; 303/3; 303/110
[58] Field of Search ............ 364/424, 426; 303/3, 303/20, 100, 110

[56] References Cited

U.S. PATENT DOCUMENTS

| | | | |
|---|---|---|---|
| 4,095,680 | 6/1978 | Vogelsang | 303/3 |
| 4,283,092 | 8/1981 | Sauka et al. | 303/3 |
| 4,400,039 | 8/1983 | Ogata | 303/3 |
| 4,402,047 | 8/1983 | Newton et al. | 364/426 |
| 4,418,963 | 12/1983 | Sprockhoff | 303/3 |

FOREIGN PATENT DOCUMENTS 2080458   3/1984   United Kingdom ............ 303/3

Primary Examiner—Felix D. Gruber
Attorney, Agent, or Firm—James B. Raden

[57] ABSTRACT

A control system for a vehicular braking system incorporating a hydrodynamic brake and a friction brake. The control system optimizes the cooperation by the hydrodynamic brake and the friction brake and improves the reliability of operation thereof by producing a control signal corresponding to the desired total braking torque and applying this control signal as an input variable to an open-loop associated with the hydrodynamic brake and to a closed-loop associated with the friction brake with a signal responsive to the instantaneous deceleration being fed back to the input of the closed-loop.

5 Claims, 3 Drawing Figures

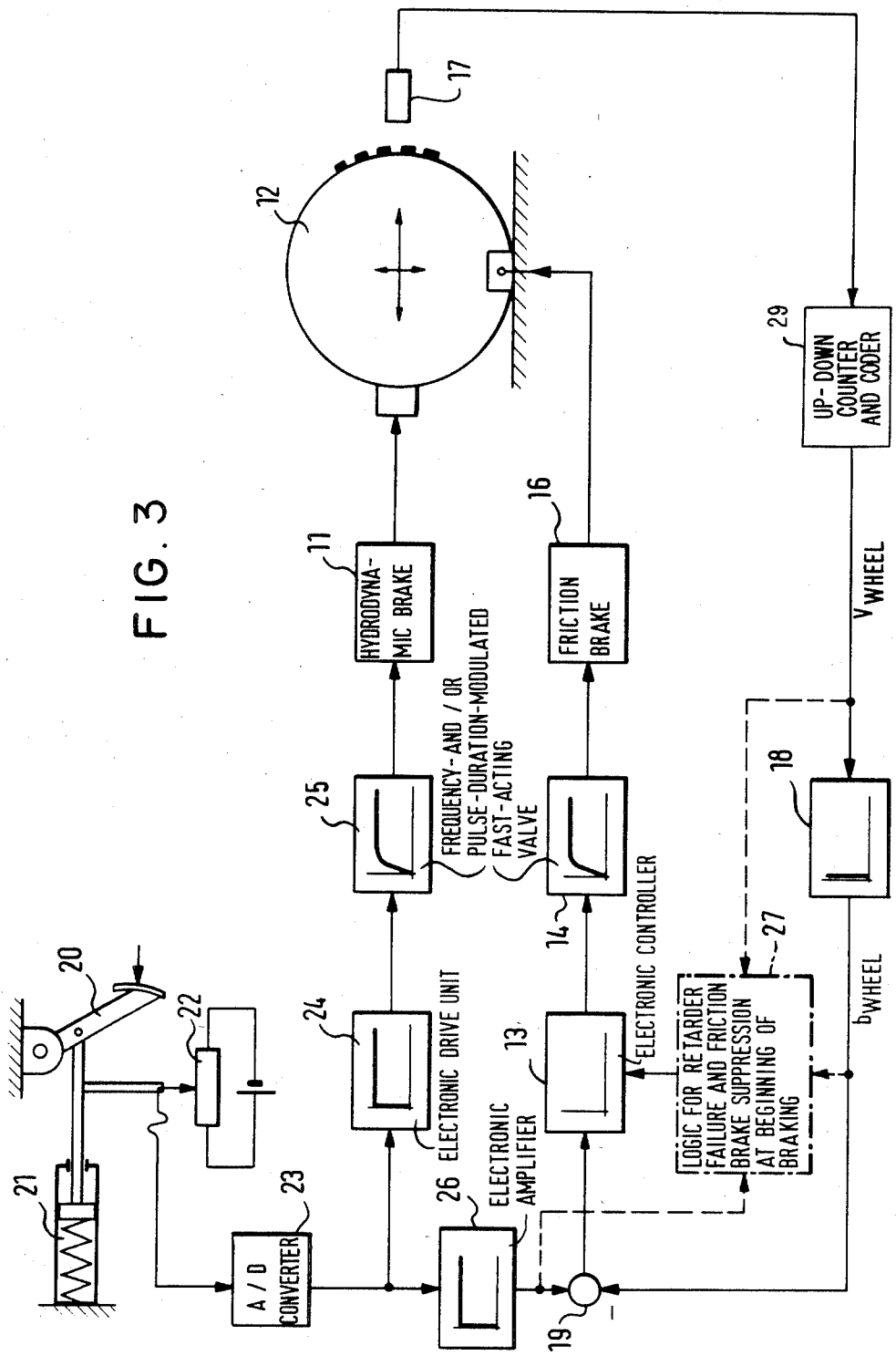

CONTROL SYSTEM FOR A VEHICULAR BRAKING SYSTEM INCORPORATING A HYDRODYNAMIC BRAKE AND A FRICTION BRAKE

CROSS REFERENCE TO RELATED APPLICATIONS

This application is a continuation-in-part application of Ser. No. 273,832, filed June 15, 1981, now abandoned.

BACKGROUND OF THE INVENTION

The present invention relates to a control system for a vehicular braking system incorporating a hydrodynamic brake and a friction brake, in particular for heavy-duty wheeled and tracked vehicles, wherein as a measure of a predetermined total brake torque the brake pedal travel, or the brake pedal force is utilized and the relevant total brake torque is generated by the hydrodynamic brake with first priority, and wherein the friction brake is controlled such that it generates the difference between the predetermined total brake torque and the brake torque provided by the hydrodynamic brake.

Control systems of this type are known. The purpose of such control systems is to ensure that the friction brake is required to provide only that share of the total braking torque that cannot be provided by the hydrodynamic brake as a result of its torque loss in the lower speed range. The passing of braking action from the hydrodynamic brake over to the friction brake should be performed with a minimum possible drop in the total brake torque.

From German Pat. No. DE-OS 2,120,743, a control system for a vehicular braking system incorporating a hydrodynamic brake and a friction brake is known, wherein the total brake torque to be generated is predetermined by the brake pedal travel, wherein the brake torque is generated with first priority by the hydrodynamic brake by means of a controlling means, and wherein the friction brake is controlled such that it generates the difference between the predetermined total brake torque and the brake torque provided by the hydrodynamic brake. The controlling means essentially comprises a pressure control valve serving to control the application of the friction brake and influenced by the predetermined desired value of the total brake torque and at the same time by a control pressure which is proportional to the brake torque of the hydrodynamic brake and counteracts the predetermined desired value in this pressure-control valve.

The main disadvantages of such a hydraulic system are (1) the delays in pressure build-up occurring in the long lines, in particular in case of air inclusions, (2) a too rapid response of the friction brake relative to the hydrodynamic brake at higher speeds, and (3) the uncertainty of the feedback signal for the brake torque of the hydrodynamic brake.

Another control system of the above-mentioned type is disclosed in U.S. Pat. No. 4,418,963, assigned to the same assignee as the present application, whose disclosure is incorporated herein by reference. This control system overcomes to a certain extent the above-mentioned disadvantages.

SUMMARY OF THE INVENTION

It is an object of the present invention to provide a control system of the type referred to hereinabove such that the control accuracy is increased and particularly the cooperation between hydrodynamic brake and friction brake is optimized while at the same time the reliability of operation is improved without necessitating increased expenditure.

Another object of the present application is to provide a control system of the type referred to hereinabove which has an improved control accuracy with respect to that obtainable with the system disclosed in the above-identified copending application.

A feature of the present invention is the provision of a control system for a vehicular braking system incorporating a hydrodynamic brake and a friction brake comprising: first means coupled to a brake pedal to produce a control signal corresponding to a desired total braking torque; an open loop coupled to the hydrodynamic brake and the first means to control the hydrodynamic brake in response to the control signal to provide at least a portion of the total braking torque; second means associated with a selected one of at least one vehicles wheel and a vehicle to produce a feedback signal proportional to an instantaneous deceleration of the vehicle; and a closed loop coupled to the first means and including the friction brake and the second means to control the friction brake in response to the control signal and the feedback signal to enable the friction brake to produce a braking torque equal to the difference between the desired total braking torque and the portion of the total braking torque.

By driving the hydrodynamic brake via an open-loop and the friction brake via a closed-loop into which the effect brought about by the hydrodynamic brake is introduced by way of negative feedback, it can be ensured that in the first place the hydrodynamic brake will always provide the maximum possible brake torque. The use of electrical signal transmission and processing simplifies the overall construction of the system and increases its reliability of operation.

An advantageous embodiment of the present invention is characterized in that an electrical element adjustable by means of the brake pedal is provided for generation of the control signal corresponding to the desired deceleration value, in that in both the open-loop and the closed-loop valves are provided as controlled members actuatable by means of electrical signals, and in that the feedback path of the closed-loop includes a differentiator having a sensor signal applied to its input which corresponds to the vehicle or wheel velocity.

The use of valves actuatable by means of electrical signals, in particular fast-acting electro-hydraulic valves, is advantageous particularly because such valves permit zero adjustment and zero stability to be accomplished without problems. Such valves are also more cost-effective than analog servo valves although their use is basically also possible without departing from the spirit of the present invention.

Preferably, the whole electrical signal transmission and signal processing is performed employing digital techniques, for which purpose the element for control signal generation requires an analog-to-digital converter connected to its output. Digital techniques enable a particularly safe and accurate performance while affording a small and, thus, space-saving construction, and enables the use of low-cost and reliable components and assemblies.

Preferably, by means of at least one digital sensor the actual deceleration value of a vehicle wheel or sprocket wheel or the average value of two wheels associated with a common axle is used as the feedback signal. This will be an advantage because the errors which occur in the measurement of the vehicle deceleration and which may be caused, for example, by uneven road surfaces, are avoided, and also because the measuring and processing of the wheel deceleration does not allow any further overbraking of the vehicle in the proximity of a locked condition of the vehicle wheels or vehicle tracks. Should the vehicle deceleration itself be used as the actual deceleration value, another increase in the braking torque could occur in the presence of a locked condition which, of course, would be undesirable.

In another characteristic feature of the invention, the controller provided in the closed-loop has another input applied to it which is connected to circuitry for handling the failure of the hydrodynamic brake and the suppression of the friction brake at the beginning of a braking action, with this circuitry having applied to it the desired deceleration value, the wheel velocity and the wheel deceleration as input variables.

The advantages of this circuitry are, on the one hand, that under normal operating conditions the action of the faster responding friction brake is delayed and held back relative to the relatively slow-acting hydrodynamic brake at higher driving speeds to avoid overloading, while at lower vehicle speeds, in the interest of allowing a good dosing or proportioning of the braking action, the friction brake is permitted to act without being retarded, and, on the other hand, this circuitry will provide for immediate take-over of the braking by the friction brake in the event of a fault or failure of the hydrodynamic brake.

BRIEF DESCRIPTION OF THE DRAWING

Above-mentioned and other features and objects of this invention will become more apparent by reference to the following description taken in conjunction with the accompanying drawing, in which:

FIG. 3 is a block diagram of a second practical embodiment of the control system of FIG. 1.

DESCRIPTION OF THE PREFERRED EMBODIMENTS

Figure 1:
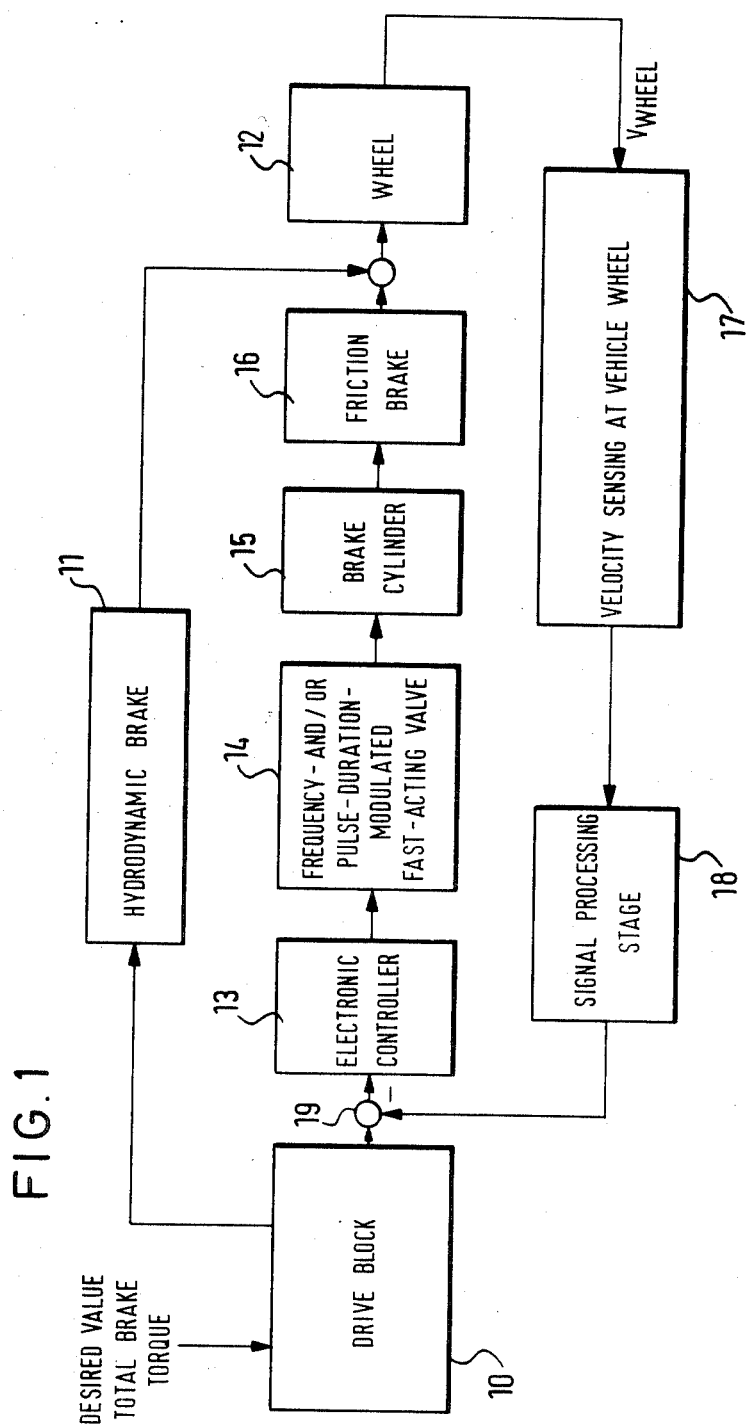
FIG. 1 is a schematic block diagram of a basic control system in accordance with the principles of the present invention.

According to the basic block diagram of FIG. 1, the desired value of the total brake torque is predetermined by the vehicle operator through the brake pedal, with an electrical signal corresponding to the brake pedal actuation being generated and applied, via a schematically shown drive block 10 as an input variable to an open-loop associated with the hydrodynamic brake 11 and as an input variable to a closed-loop associated with the friction brake 16, the closed-loop comprising an electronic controller 13, a valve device 14, brake cylinder 15, and finally friction brake 16.

The vehicle deceleration caused by hydrodynamic brake 11 and, as the case may be, by friction brake 16, is sensed by means of an electrical acceleration or velocity sensor 17 at the vehicle or vehicle wheel 12, is passed through a signal processing stage 18 and is returned to electronic controller 13 via a summing stage 19 with a negative sign.

In this arrangement, electronic controller 13 ensures that the lacking or brake torque difference is produced by friction brake 16 via brake valve 14. Under specific operating conditions, for example, failure of the hydrodynamic brake 11 or decelerated brake torque development of the hydrodynamic brake, data will be processed by circuit 27 to further influence controller 13.

In principle, the total brake torque is the sum of both partial brake torques. However, above a specific speed, say at more than 30 km/h, only hydrodynamic brake 11 will be active because in this speed range the share of friction brake 16 in the total brake torque equals zero.

Figure 2:
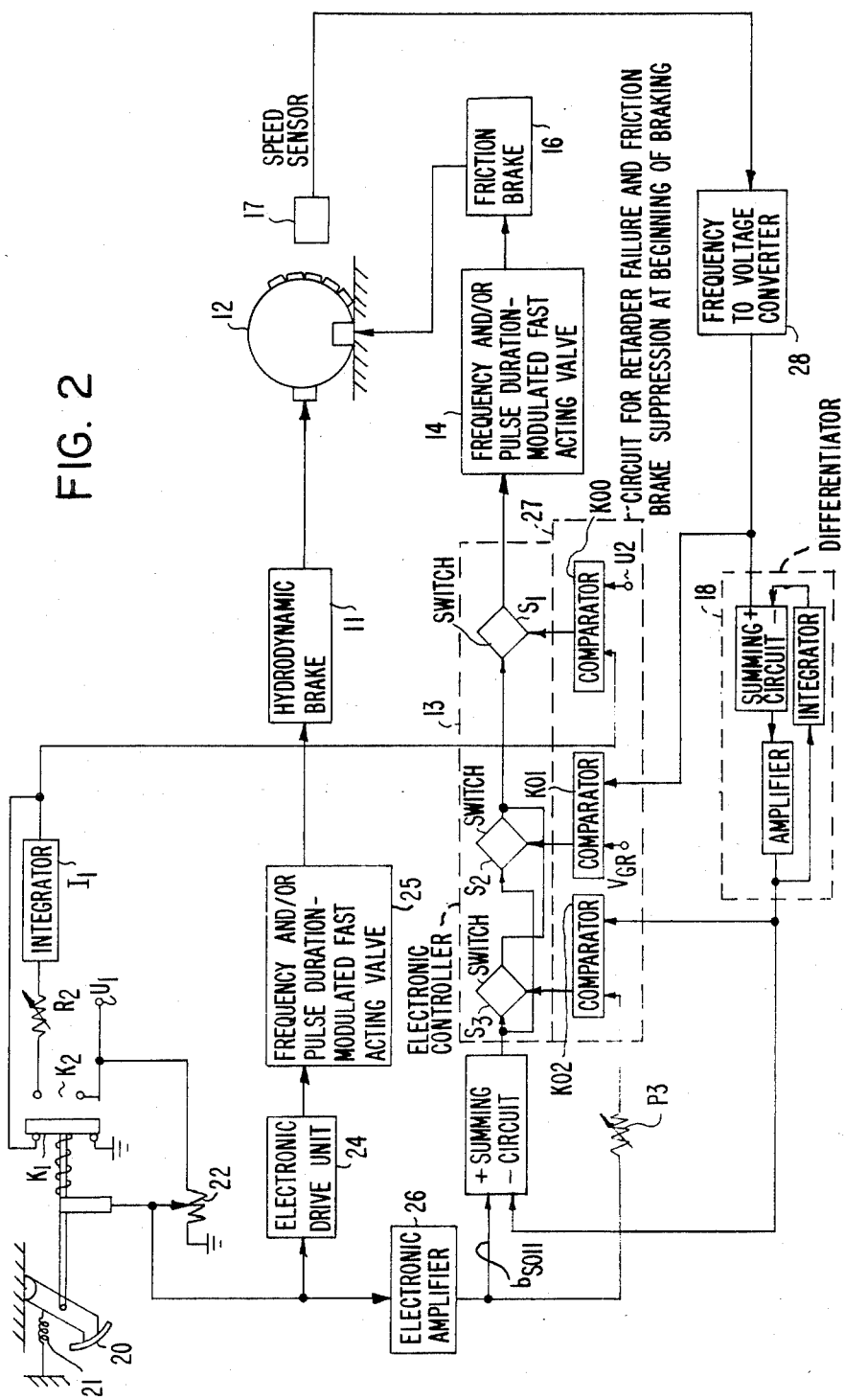
FIG. 2 is a block diagram of a first practical embodiment of the control system of FIG. 1.

The more detailed schematic block diagram of FIG. 2 shows a brake pedal 20 which acts in opposition to a spring 21 and has the slider of a potentiometer 22, which is connected to a power source, connected to it so that the vehicle operator's pressure on pedal 20 is translatable via spring 21 into a pedal travel permitting adjustment of potentiometer 22 and, thus, generation of an electrical signal which corresponds to the desired value of the required total brake torque. This electrical signal is coupled to the open-loop which is associated with hydrodynamic brake 11 and includes an electronic drive unit 24 and a valve 25 inserted upstream from hydrodynamic brake 11, valve 25 responding to frequency- and/or pulse-duration-modulated electrical signals.

Further, the output signal of potentiometer 22 is supplied, via an electronic amplifier 26, to one input of summing circuit 19 whose output is coupled to controller 13 associated with the closed-loop. The output of controller 13 is connected to a frequency or pulse duration-modulated, fast-acting valve 14 which serves to actuate friction brake 16 which is connected to the output of valve 14.

Both brakes, i.e., hydrodynamic brake 11 and friction brake 16, act on the vehicle wheels which are assigned reference numeral 12.

The feedback of the vehicle deceleration is accomplished by means of a speed sensor 17 which may be an electromagnetic speed sensor providing a pulse signal whose frequency is proportional to the actual velocity value, in particular the actual velocity value of a vehicle wheel or sprocket wheel. This frequency signal is converted to a direct current voltage in frequency-to-voltage converter 28. The resultant direct current voltage is coupled as an acceleration or deceleration signal to the other input of summing circuit 19 after having passed through a differentiating stage 18. The output signal of circuit 19 is coupled to controller 13 as a signal indicating the difference between the required total brake torque and the brake torque supplied hydrodynamic brake 11.

In a preferably employed supplementary device, electronic controller 13 is adapted to be further influenced dependent on circuit 27 for retarder failure and suppression of the friction brake at the beginning of a braking action, circuit 27 having applied to its input the desired value of the total brake torque, the wheel velocity and the wheel acceleration. Circuit 27 accomplishes the following: (1) in the event of a failure of hydrodynamic brake 11, friction brake 16 will immediately take over that share of the braking torque hydrodynamic brake 11 is unable to provide, (2) at higher driving speeds, the action of the faster responding friction brake 16 is delayed and held back to avoid overloading, and (3) at lower driving speeds, in the interest of allowing good proportioning of the brake action, friction brake 16 is permitted to act without being retarded.

The control system of this invention preferably uses digital circuit components but first will be described in greater detail employing analog components, such as those employed in the above-identified copending application.

In FIG. 2, the control system of the present invention is shown employing analog components. Summary circuit 19 receives, on the one hand, the desired wheel deceleration value $b_{SOLL}$ via a mechanical-electrical converter, in particular, a potentiometer 22 connected to brake pedal 20 and amplifier 26, while on the other hand, circuit 19 receives the instantaneous wheel deceleration value $b_{IST}$ via a rotational speed sensor 17, converter 28 and a differentiator 18. Differentiator 18 converts the speed signal into an acceleration (deceleration) signal. The two electrical quantities $b_{SOLL}$ and $b_{IST}$ are compared in circuit 19, with the resultant difference or error signal being delivered, via switches S3, S2 and S1, to an electrohydraulic valve 14 where the error signal is converted into a corresponding fluid flow leading to the friction brake 16. The wheel cylinder pistons of brake 16 urge the friction pads into engagement with the disc or drum to decelerate the wheels. If the actual wheel deceleration $b_{IST}$ corresponds to the desired deceleration $b_{SOLL}$, no resultant signal, i.e., no error signal, will occur at circuit 19, and the status of deceleration will be maintained.

However, this described sequence of operations is allowed to occur only with switches S3 or S2 and S1 in a closed position. Since friction brake 16 is to act only under specific conditions—as already explained—the action of friction brake 16 is influenced, via switches S1, S2 and S3, dependent on various operating parameters.

These switches are in turn driven by respective comparators KO, KO1 and KO2 of circuit 27 which are required to sense the individual operating states.

Comparator KO is used to sense the duration of a braking action, this inquiry serving to suppress a premature action of friction brake 16.

Secured to brake pedal lever 20 is a rod having a spring-operated, displaceable disc to actuate contacts K1 and K2. With the relative distance between the two contacts sufficiently small, contact K2 will be quickly closed on operation of brake pedal 20 and will not open until brake pedal 20 has returned to its initial position. This permits a return movement of the brake pedal without the function of friction brake 16 being impaired.

Therefore, in addition to electrically presetting a desired deceleration value at potentiometer 22, operation of brake pedal 20 also causes opening or closing of contact K1 or closing or opening of contact K2.

The closed switch position of contact K1 is to ensure that the output of integrator I1 is zero prior to operation of brake pedal 20.

The closed switch position of contract K2 enables integrator I1 as a result of which its output will produce a progressively increasing electric voltage. The voltage increase per unit of time is adjustable via the potentiometer P2 (coefficient of integration). This positive voltage is compared with the predetermined negative voltage U2 in comparator KO. Only when the sum of these two input voltages $\int P2\ U1\ dt > |U2|$ is positive at comparator KO, will its output have a defined voltage influencing switch S1 (S1=closed). Switch S1 will remain closed until contact K1 is again closed whereby the output voltage of integrator I1 is rendered zero.

This circuitry causes a retarded action of friction brake 16 at the beginning of braking, which is adjustable via the coefficient of integration through means of potentiometer P2 (adjustment to the response of the hydrodynamic brake is possible), and ensures in the standby mode an immediate action of friction brake 16 in the event the effect of the hydrodynamic brake decreases.

By means of comparator KO1, the speed is sensed, this inquiry serving to isolate or connect controller 13 from or with valve 14.

The quantity corresponding to a predeterminable threshold speed is predetermined in the form of an electric voltage $V_{GR}$ applied to an input of comparator KO1. $V_{GR}$ should correspond to an actual speed $V_{IST}=30$ Km/h, for example.

If the actual speed $V_{IST}$ is below the threshold speed $V_{GR}$, the output at comparator KO1 is positive and switch S2 is closed. Only if $|V_{IST}|$ is greater than $|V_{GR}|$ will switch S2 be opened via comparator KO1. The signal to friction brake 14 is thereby interrupted.

By means of comparator KO2, the deceleration is sensed, serving to detect the instantaneous functioning condition of hydrodynamic brake 11. At low speeds or with hydrodynamic brake 11 defective, hydrodynamic brake 11 is not in a position to provide the predetermined brake torque in which cases friction brake 16 is required to act.

At the beginning of a braking action and with $|b_{IST}|$ being smaller than $|b_{SOLL}|$, comparator KO2 will keep switch S3 closed, this switch being open only if the condition $|b_{IST}|$ greater than $|b_{SOLL}|$ is satisfied. In the last-mentioned case, action of friction brake 16 in addition to hydrodynamic brake 11 is not desired.

Potentiometer P3 serves to ensure the action of friction brake 16 in the event of a malfunctioning of hydrodynamic brake 11. In this case it is not ensured that $b_{IST}=b_{SOLL}$ for $V_{IST}$ greater than $V_{GR}$, in spite of an operable hydrodynamic brake.

The combined function of the inquiries explained for the individual cases results in the following friction brake operating conditions:

RB=1: Friction brake may act.

RB=0: Friction brake may not act.

The various possible operating states are combined to five cases listed in the table below:

| | | |
|---|---|---|
| 1. $\int P2U_1 dt > U_2$ | $V_{GR} > V_{IST}\ v\ b_{SOLL} > b_{IST}$ | → RB = 1 |
| 2. $\int P2U_1 dt > U_2$ | $V_{GR} > V_{IST}\ v\ b_{SOLL} < b_{IST}$ | → RB = 1 |
| 3. $\int P2U_1 dt > U_2$ | $V_{GR} < V_{IST}\ v\ b_{SOLL} > b_{IST}$ | → RB = 0 |
| 4. $\int P2U_1 dt > U_2$ | $V_{GR} < V_{IST}\ v\ b_{SOLL} < b_{IST}$ | → RB = 0 |
| 5. $\int P2U_1 dt < U_2$ | $V_{GR} \lessgtr V_{IST}\ v\ b_{SOLL} \lessgtr b_{IST}$ | → RB = 0 |

Cases 1 to 4 and case 5 differ in the first place in the inquiry for the brake actuation duration. In cases 1 to 4, the brake pedal has been actuated a longer time than in case 5. Therefore, switch S1 is closed in cases 1 to 4, whereas it is not in case 5.

Switch S1 is ANDed together with switches S2 and S3. Therefore, for the friction brake to act, switches S1 and S2 or S3 must be closed. Accordingly, it is clear that switches S2 and S3 are connected in a logic OR operation. The various operating cases illustrated may be described as follows:

Case 1: The friction brake acts because the actual speed $V_{IST}$ is lower than the threshold speed $V_{GR}$ and, in addition, the actual deceleration $b_{IST}$ is lower than the desired deceleration $b_{SOLL}$.

Case 2: Because of the logic connection, the friction brake is allowed to act theoretically. However, $b_{IST}$ being greater than $b_{SOLL}$, there exists an error signal with a negative sign which causes disengagement of the brake pads from the disc, i.e., the friction brake will not act.

Case 3: In this case, the actual speed $V_{IST}$ is higher than the predetermined threshold value $V_{GR}$, the predetermined deceleration, however, is not reached (due to a defective hydrodynamic brake, for example). Therefore, the friction brake will become active.

Case 4: The two actual values ($b_{IST}$, $V_{IST}$) exceed the desired value ($b_{SOLL}$) and the threshold value ($V_{GR}$), respectively. The signal for the valve 14 is interrupted.

Case 5: The switch position of S1 is dominant in this case, irrespective of the operating state of the brake system. This status is only reached at the beginning of a braking action, it represents the retarded action of the friction brake.

The examples explained in detail show clearly that the optimization of the cooperation aimed at between friction brake and hydrodynamic brake is clearly accomplished by the measures of the present invention, and this with a minimum amount of effort, which is of particular importance for putting this control system into practice.

FIG. 3 is a block diagram of a digital version of the control system of the present invention. Digital components operating in the same manner as the analog components of FIG. 2 are provided for controller 13, circuit 27 and differentiator 18. To provide digital signals at the input to amplifier 26 and the input to circuit 27 and differentiator 18, an analog-to-digital converter 23 is inserted between potentiometer 22 and amplifier 26 and an up-down counter and coder 29 is inserted between speed sensor 17 and the input of differentiator 18 and circuit 27.

While I have described above the principles of my invention in connection with specific apparatus, it is be clearly understood that this description is made only by way of example and not as a limitation to the scope of my invention as set forth in the objects thereof and in the accompanying claims.

I claim:

1. A control system for a vehicular braking system incorporating a hydrodynamic brake and a friction brake comprising:

first means coupled to a brake pedal to produce a control signal corresponding to a desired total braking torque;

an open loop coupled to said hydrodynamic brake and said first means to control said hydrodynamic brake in response to said control signal to provide at least a portion of said total braking torque, said open loop including a first valve coupled to said hydrodynamic brake controllable by said control signal;

second means associated with a selected one of at least on vehicle wheel and a vehicle to produce a feedback signal proportional to an instantaneous deceleration of said vehicle; and a closed loop coupled to said first means and including said friction brake and said second means to control said friction brake in response to said control signal and said feedback signal, said closed loop including a brake operation sensing comparator to operate a first switch to permit operation of said friction brake after a predetermined duration of operation of the brake pedal taking place, a speed sensing comparator connected to operate a second switch to permit operation of said friction brake if the actual vehicle speed is greater than a predetermined threshold speed a deceleration sensing comparator to operate a third switch to interrupt operation of said friction brake if the actual vehicle wheel deceleration is greater than a predetermined wheel deceleration said closed loop including a second valve coupled to said friction brake controllable by the difference between said control signal and said feedback signal, and to enable said friction brake to produce a braking torque equal to the difference between said desired total braking torque and said portion of said total braking torque.

2. The control system of claim 1 wherein said brake operation sensing comparator receives an input from said first means coupled to said brake pedal.

3. The control system of claim 1 wherein said second means includes a vehicle speed sensor that provides an input signal representing the vehicle speed to said speed sensing comparator.

4. The control system of claim 1 wherein said second means includes a vehicle speed sensor and a differentiator that provides an input signal representing the vehicle deceleration to said deceleration sensing comparator.

5. The control system of claim 1 wherein each of said first and second valves comprises a digitally controllable electrohydraulic valve.

* * * * *